July 10, 1934.                J. H. HARVEY                1,966,245
                             CONTROL SYSTEM
                          Filed Oct. 20, 1930
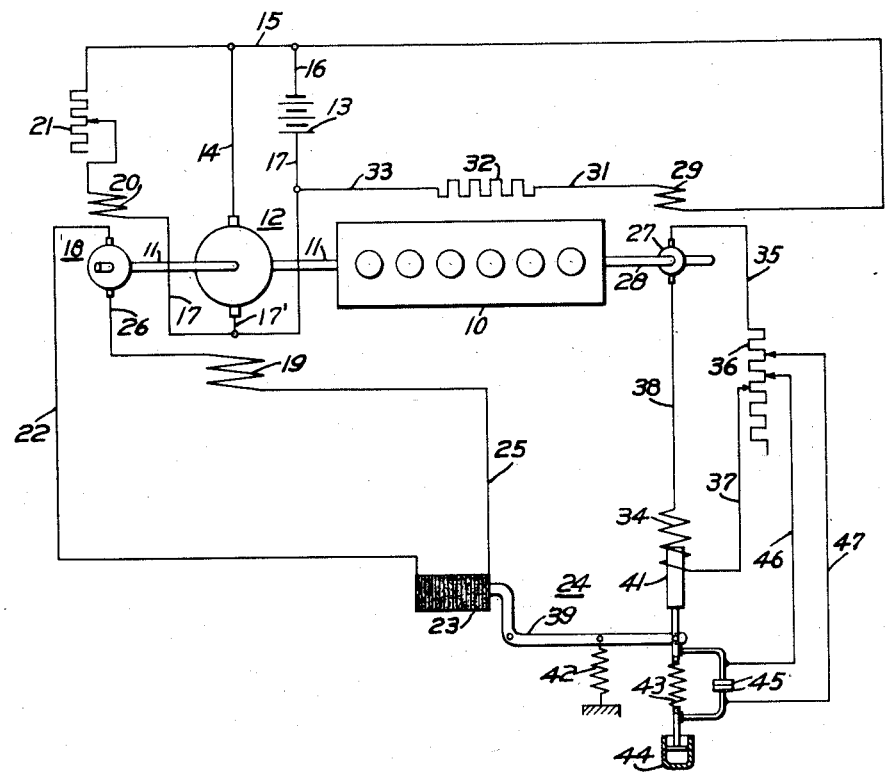
INVENTOR
James H. Harvey.
BY
ATTORNEY Patented July 10, 1934

1,966,245

UNITED STATES PATENT OFFICE 1,966,245

CONTROL SYSTEM

James H. Harvey, Wilkinsburg, Pa., assignor to Westinghouse Electric & Manufacturing Company, a corporation of Pennsylvania Application October 20, 1930, Serial No. 489,883

5 Claims. (Cl. 290—40)

My invention relates, generally, to control systems and more particularly to systems for regulating the operation of prime movers, such as internal-combustion engines, when they are utilized for driving electric generators.

The copending application of Clinton R. Boothby, Serial No. 464,829, filed June 30, 1930, and assigned to the Westinghouse Electric and Manufacturing Company, discloses a control system that functions to control the speed of a prime mover by regulating the torque requirements of the generator which is being driven by the prime mover. This is accomplished by providing a motor-operated rheostat for adjusting the field current of the generator and means for controlling the rheostat in response to the speed of the prime mover.

According to the present invention, the speed of a prime mover may be controlled by regulating the field current of a generator, which is being driven by the prime mover, by means of a carbon-pile regulator which is responsive to the speed of the prime mover.

However, regulating systems of this type are subject to hunting or surging, caused by the over-running of the regulator arm as a result of the time lag which is inherent in a system which must depend upon actual changes in the apparatus being controlled to react on the regulator.

An object of my invention, generally stated, is to provide a control system for regulating the speed of a prime mover which shall be simple and efficient in operation and which may be readily and economically installed.

A more specific object of my invention is to prevent the hunting or surging action of a regulating system.

For a fuller understanding of the nature and objects of the invention, reference may be had to the following detailed description, taken in conjunction with the accompanying drawing, in which the single figure is a diagrammatic view of a control system which embodies my invention.

In the drawing is illustrated a portion of a power-generating-and-transmitting system in which 10 is a prime mover, which may be an internal-combustion engine that is connected, by means of a shaft 11, to a generator 12 of any suitable type for furnishing electrical energy.

With a view to simplifying the drawing, the electric motors, which may constitute the load on the generator 12, and the connections thereto have been omitted. However, it will be readily understood that the generator may be utilized to supply power to electric motors or any other electrical equipment which it may be desirable to operate.

As shown in the drawing, a storage battery 13 may be connected across the generator 12 and may constitute a part of the load on the generator. The connections to the battery 13 may be traced from one side of the generator 12, through conductors 14, 15 and 16, to one side of the battery 13 and from the other side of the battery, through conductors 17 and 17', to the other side of the generator 12.

An exciter 18 is provided for energizing a field winding 19 of the generator 12. As shown, the exciter 18 is connected to the shaft 11, which is driven by prime mover 10. It will be observed that the field winding 20 of the exciter 18 is disposed to be energized from a storage battery 13. The circuit for the field winding 20 extends from one side of the battery 13, through the conductors 16 and 15, a variable resistor 21, the field winding 20 and conductor 17, to the other side of the battery. Since the voltage of the battery 13 will remain practically constant, it will be understood that the exciting current for the field winding 20 of the exciter 18 may be maintained at any desired value by adjusting the variable resistor 21. The armature of the exciter 18 is connected to the field winding 19 of the generator 12, through conductor 22, thence through the carbon discs 23 of a carbon-pile regulator 24, conductor 25 and the field winding 19 and back to the other side of the exciter 18 through conductor 26.

In accordance with the system disclosed in the copending Boothby application, means are provided for regulating the amount of current flowing in the field winding 19 of the generator 12, in response to the speed of the prime mover 10, in such manner that, if the speed becomes excessive, the control means will cause a larger amount of current to flow in the field winding 19 and, consequently, increase the load or torque required for driving the generator 12 to such extent that the prime mover 10 will slow down to its normal operating speed.

It will be observed that a small control generator 27 is connected to a shaft 28 which is driven by the prime mover 10. The generator 27 is provided for the purpose of generating a voltage which is directly proportional to the speed of rotation of the prime mover 10, in order that the field current of the generator 12 may be regulated by an electrical means in response to the speed changes in the prime mover 10.

A constant excitation is provided for the generator 27 by a field winding 29 which is connected across the battery 13. The circuit for the field winding 29 extends from one side of the battery 13, through conductors 16 and 15, the field winding 29, conductor 31, a resistor 32 and conductors 33 and 17, to the other side of the battery 13. Since the excitation of the generator 27 is maintained at a constant value, it will be understood that the voltage generated by the generator 27 will be directly proportional to its speed of rotation.

With a view to controlling the field current supplied to the field winding 19 of the generator 12, the current generated by the control generator 27 is utilized for energizing an actuating coil 34 of the carbon-pile regulator 24. The current from the generator 27 is supplied to the coil 24, through conductor 35, a variable resistor 36, conductor 37, the coil 34 and conductor 38, to the generator 27.

As previously mentioned, the carbon discs 23 of the regulator 24 are connected in series with the field winding 19 and, as is well known in the art, the resistance of the carbon discs 23 and, consequently, the amount of current permitted to flow through them, depends upon pressure maintained between the discs. As is shown, the pressure on the discs is controlled by a pivotally mounted lever arm 39 which is disposed to be actuated by a core 41. When the coil 34 is energized by a predetermined value of current, the core 41 is raised to a position, which depends upon the amount of current flowing in the coil 34, and, consequently, a certain pressure is maintained between the discs 23. The actuation of the core 41 is opposed by spring 42 which normally biases the lever arm 39 downwardly and releases the pressure on the carbon discs 23.

Assuming that the prime mover 10 is operating, momentarily, at a speed which is higher than that for which the regulating system is adjusted, the voltage generated by the control generator 27 will be above the normal value. Consequently, the current flowing through the coil 34 of the regulator 24 is increased, and the lever arm 39 is actuated to compress the carbon discs 23. The increase in the pressure between the discs 23 lowers their resistance, and, consequently, the exciting current for the field winding 19 of the generator 12 is increased, thereby increasing the amount of current generated by the generator 12. The increase in the load carried by the generator 12 increases the torque requirements of the generator, which increases the load on the prime mover 10, and, consequently, the speed of rotation of the prime mover 10 is reduced to a predetermined value.

In case the speed of the prime mover 10 falls below the normal value, the voltage of the generator 27 will be below normal. Consequently, the current flowing through the coil 34 will be decreased, and the spring 42 will pull the lever arm downwardly, which decreases the pressure on the carbon discs 23, thereby increasing their resistance. The field current of the generator 12 will be decreased in value, whereby the load carried by the generator 12 will be decreased. The decrease in the load carried by the generator 12 will permit the prime mover 10 to increase its speed to its normal value.

If it is desired to change the speed at which the prime mover 10 is to be operated, this may be accomplished by adjusting the variable resistor 36 which controls the amount of current supplied to the actuating coil 34 of the regulator 24. In this manner, the ratio of the voltage generated by the control generator 27, which is proportional to the speed of the prime mover 10, to the current supplied to the actuating coil 34, may be varied.

It may be readily understood that the above described regulating system will maintain a practically constant speed of the prime mover 10. However, as previously described, a regulating system of this type is subject to hunting, which is caused by the over-shooting of the regulator 24 when it responds to a change in the speed of the prime mover 10.

In order to prevent the hunting or surging action of the regulator 24, a spring 43 is interposed between a dashpot mechanism 44 and the lever system of the regulator 24. As is shown, a contact member 45 is mounted on each of the mechanical systems separated by the spring 43. In this instance, the contact members 45 have been shown as being closed when the regulator 24 is in a static condition, although, if desired, the contact members may be so mounted that they will be normally separated. It will be observed that the contact members 45 are disposed to shunt a section of the resistor 36 when they are in their closed position, the contact members being connected across the portion of the resistor 36 by conductors 46 and 47.

Assuming a slight increase in the speed of the prime mover 10, the voltage of the control generator 27 will be increased, which will cause the regulator 24 to compress the carbon discs 23 and increase the load current of the generator 12, which will have a tendency to reduce the engine speed to its normal value. However, as a result of the friction of the dashpot 44, any quick action of the regulator core 41 causes the spring 43 to be slightly extended, thus separating the contact members 45. Since the contact members 45 normally short circuit a section of the resistor 36, its resistance is slightly increased when the contact members 45 are separated. Therefore, the amount of current supplied to the actuating coil 34 of the regulator 24 will be decreased, which is the same result that is accomplished by a reduction in the speed of the prime mover 10 normally caused by an increase in the load on the generator 12 as a result of the action of the regulator 24. This scheme thus anticipates the change in the regulator setting and produces an indication in the control generator circuit of the load change and consequent speed change which will be caused by the new position of the regulator arm 39, before this position is reached, thereby preventing over-shooting of the regulator arm.

While I have described this anti-hunting scheme as being applicable to a regulating system utilizing a carbon-pile regulator, it will be readily understood that the system herein described may be applied to other regulating systems.

Since numerous changes may be made in the above-described structure and different embodiments of the invention may be made without departing from the scope thereof, it is intended that all matter contained in the foregoing description, or illustrated in the accompanying drawing shall be interpreted as illustrative, and not in a limiting sense.

I claim as my invention:

1. In a power system, in combination, an electric generator having a field winding, a prime mover for driving the generator, means for energizing the field winding of the generator, a regulator responsive to the speed of rotation of the prime mover for controlling the energization of the generator field winding to regulate the speed of the prime mover, said regulator having an actuating coil, means responsive to the speed of rotation of the prime mover for energizing the actuating coil of the regulator, a resistor for controlling the current in said actuating coil, and means actuated by said regulator for varying said resistor to prevent hunting of the regulator.

2. In a power system, in combination, an electric generator, a prime mover for driving the generator, a source of direct current electrically connected to the generator for exciting it, a regulator for controlling the generator exciting current, means responsive to the speed of rotation of the prime mover for energizing the regulator, means for controlling the energizing current supplied to the regulator, and means responsive to the movement of the regulator for varying the current supplied to the regulator to prevent hunting thereof.

3. In a power-transmission system, in combination, an electric generator, a prime mover for driving the generator, an exciter driven by the prime mover and connected to provide exciting current for the generator, a regulator having an actuating coil and a core member actuated by the coil for controlling the exciting current for the generator, means responsive to the speed of rotation of the prime mover for energizing the actuating coil of the regulator and means responsive to the movement of the regulator core for controlling the current supplied to the regulator coil to prevent hunting of the regulator.

4. In a power system, in combination, an internal-combustion engine, a generator having a field winding, an exciter connected across the generator field winding, said generator and exciter being driven by the engine, a regulator having an actuating coil and a lever system disposed to be actuated by the coil to control the current delivered to the generator field winding, means responsive to the speed of the engine for energizing the actuating coil of the regulator, and means responsive to the movement of the lever system for controlling the current supplied to the regulator coil to prevent hunting of the regulator.

5. In a power system, in combination, an electric generator, a prime mover for driving the generator, a source of exciting current connected to the generator, a regulator having an actuating coil and a lever system disposed to be actuated by the coil to control the exciting current supplied the generator, means responsive to the speed of the prime mover for energizing the actuating coil of the regulator, and contact members disposed to be actuated by the lever system to control the current supplied to the regulator coil to prevent hunting of the regulator.

JAMES H. HARVEY.